Sept. 13, 1955   C. PAGE ET AL   2,717,729
EGG HANDLING AND PACKAGING MACHINE
Original Filed Jan. 16, 1950   5 Sheets-Sheet 2

INVENTORS
CLARENCE PAGE
BY GEORGE A. PAGE
ATTORNEYS

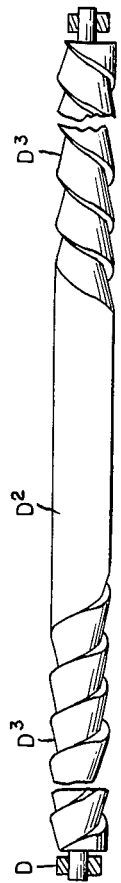
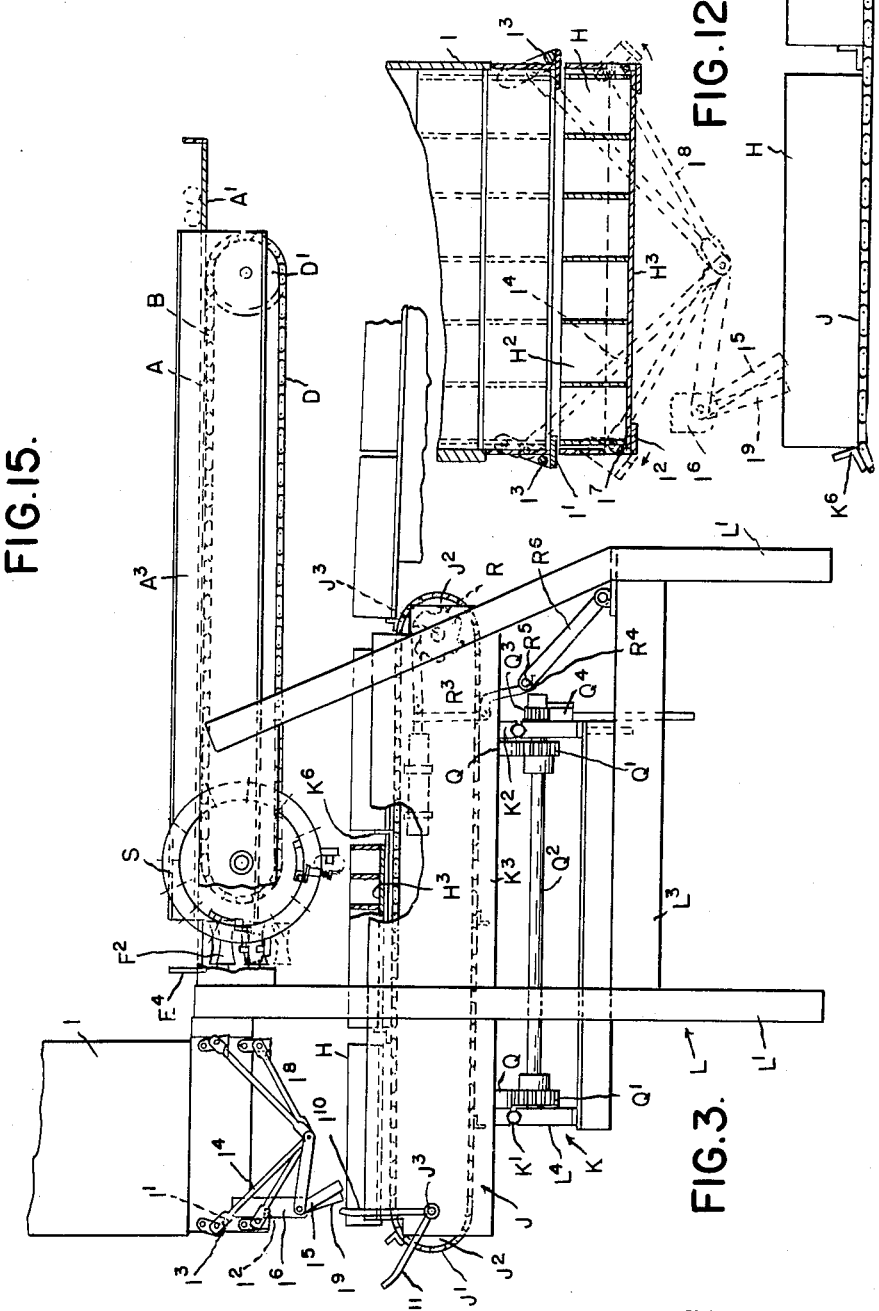

Sept. 13, 1955 C. PAGE ET AL 2,717,729
EGG HANDLING AND PACKAGING MACHINE
Original Filed Jan. 16, 1950 5 Sheets-Sheet 4
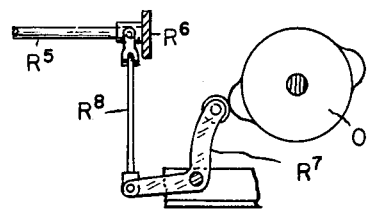
FIG.11.
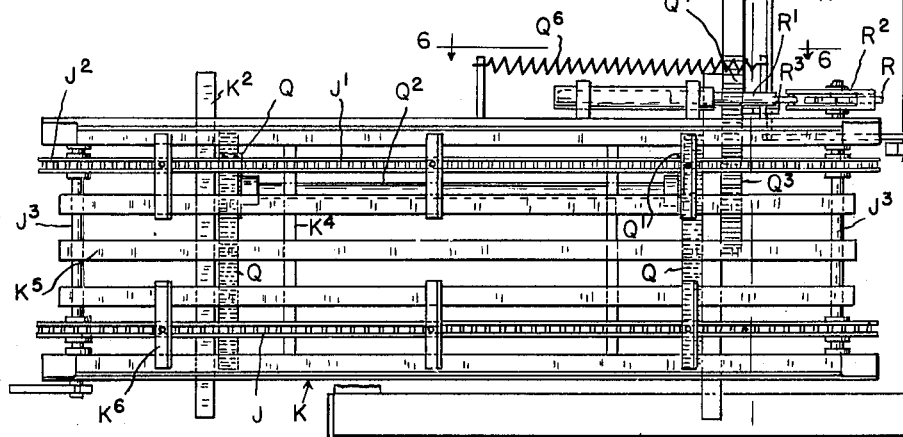
FIG.4.
FIG.5.
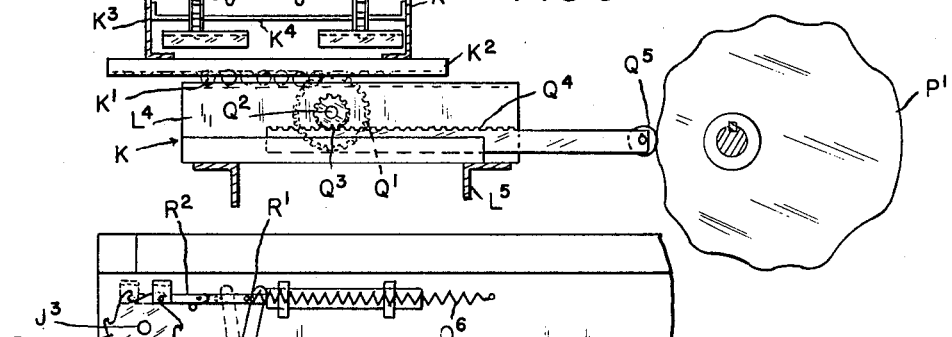
FIG.6.
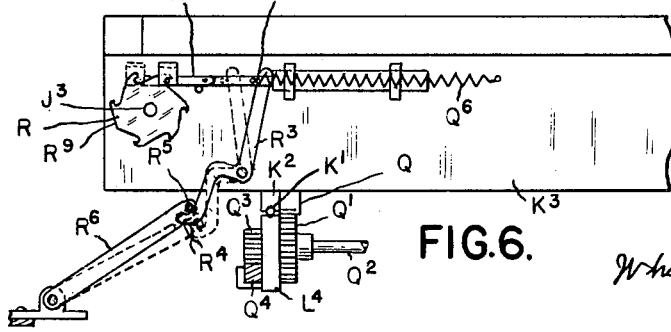
INVENTORS
CLARENCE PAGE
BY GEORGE A. PAGE
Whittemore Hulbert & Belknap
ATTORNEYS

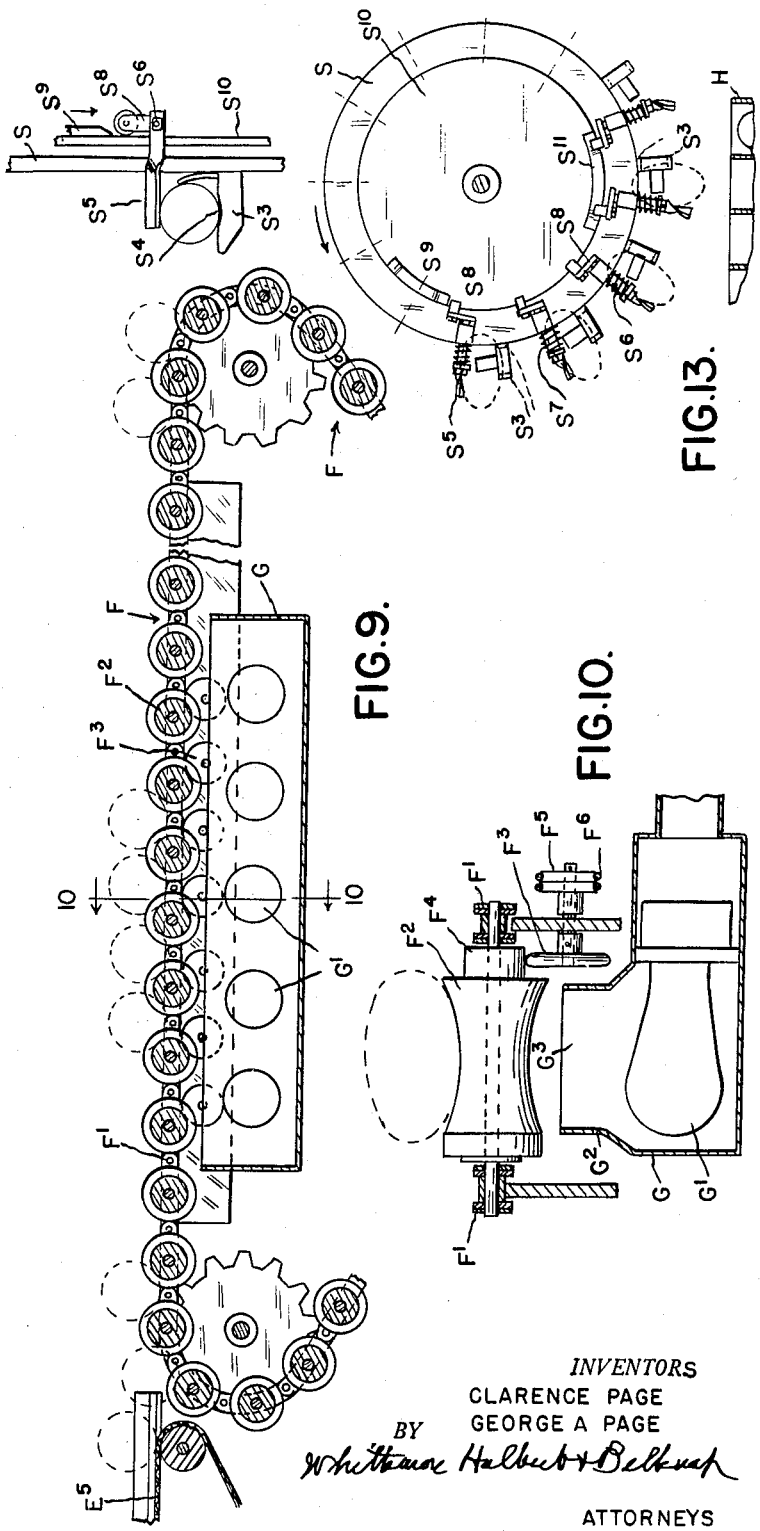
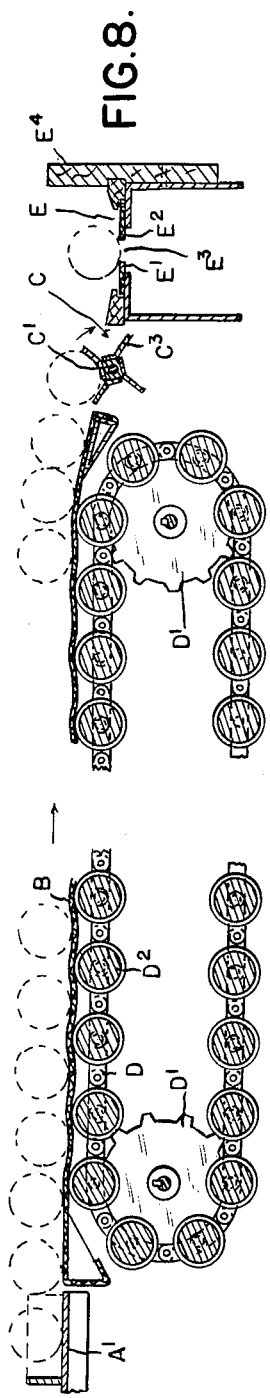
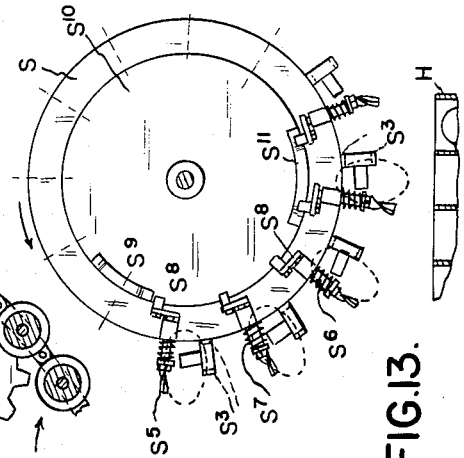
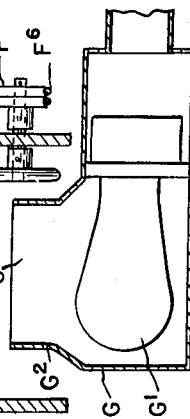

United States Patent Office 2,717,729
Patented Sept. 13, 1955

2,717,729

EGG HANDLING AND PACKAGING MACHINE

Clarence Page and George A. Page, Detroit, Mich.

Original application January 16, 1950, Serial No. 138,714. Divided and this application August 4, 1952, Serial No. 302,492

8 Claims. (Cl. 226—14)

The invention relates to a mechanism for handling eggs and placing the same in cartons for merchandising, and the instant application forms a divisional of our pending application Serial No. 138,714, filed January 16, 1950. The parent application was directed generally to a mechanism for handling eggs, including a means for receiving eggs from a supply and arranging the same in series, means for advancing the series either to a candler or directly to packaging means, by which latter the eggs are successively placed in the individual cells of cartons. The present divisional application while describing the complete automatic mechanism is directed more particularly to the packaging means, and the invention consists in the general construction and certain specific features thereof, as hereinafter described.

In the drawings:

Fig. 3 is an end elevation;

Fig. 4 is a plan view of the carriage and operating mechanism therefor;

Fig. 5 is a section on line 5—5, Fig. 4;

Fig. 6 is a section on line 6—6, Fig. 4;

Fig. 7 is an elevation parallel to line 7—7, Fig. 1;

Fig. 8 is a section on line 8—8, Fig. 1;

Fig. 9 is a section on line 9—9, Fig. 1;

Fig. 10 is an enlarged cross-section on line 10—10, Fig. 9;

Fig. 11 is a section on line 11—11, Fig. 4;

Fig. 12 is a vertical section through a portion of the carton magazine showing the mechanism for successively dropping the cartons;

Fig. 13 is an elevation of the egg depositing mechanism viewed from the rear;

Fig. 14 is a section on line 14—14, Fig. 7 on a larger scale; and

Fig. 15 is an elevation of one of the spirally grooved rollers identified by the reference character.

Figure 1:
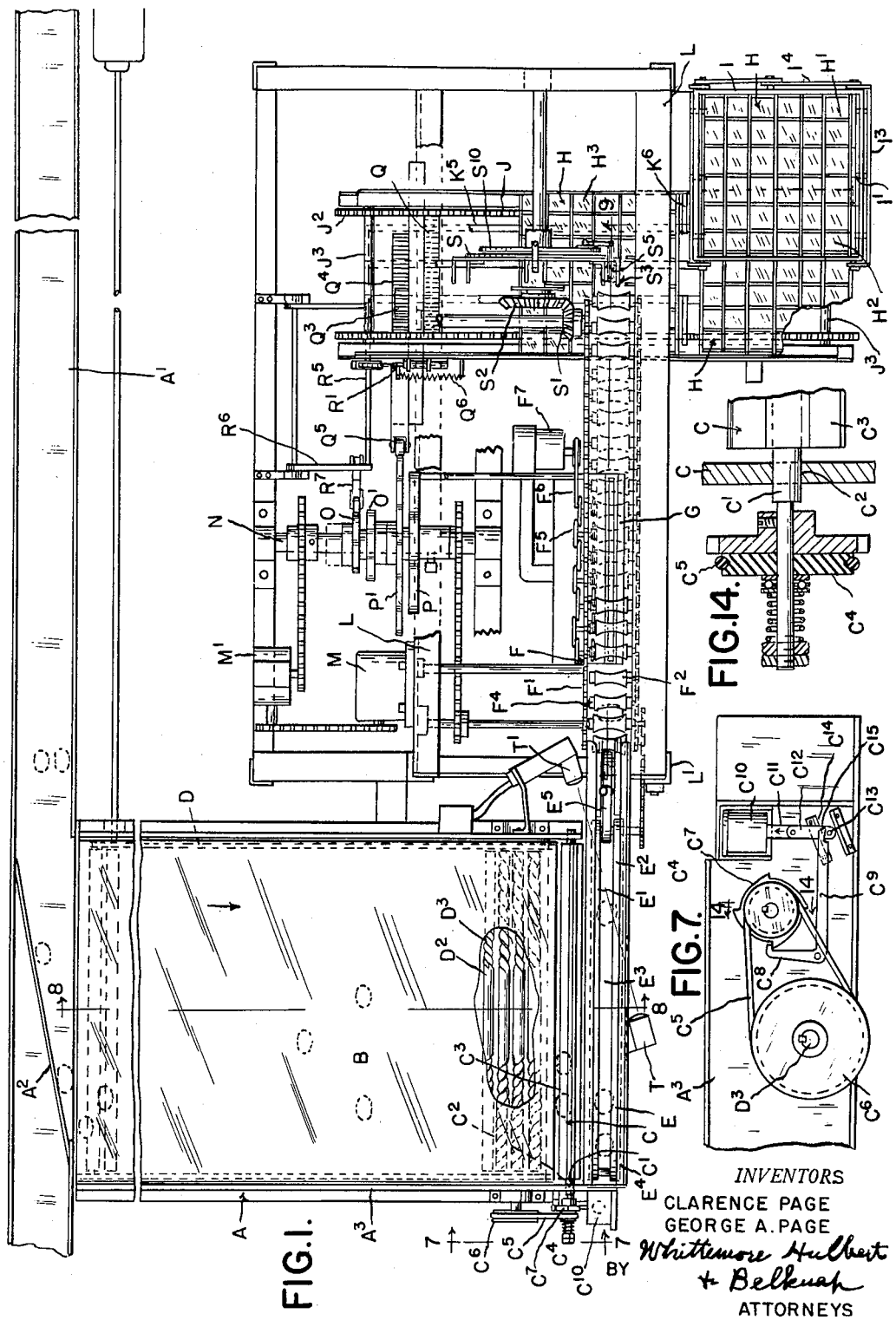
Fig. 1 is a plan view of the machine.
Figure 2:
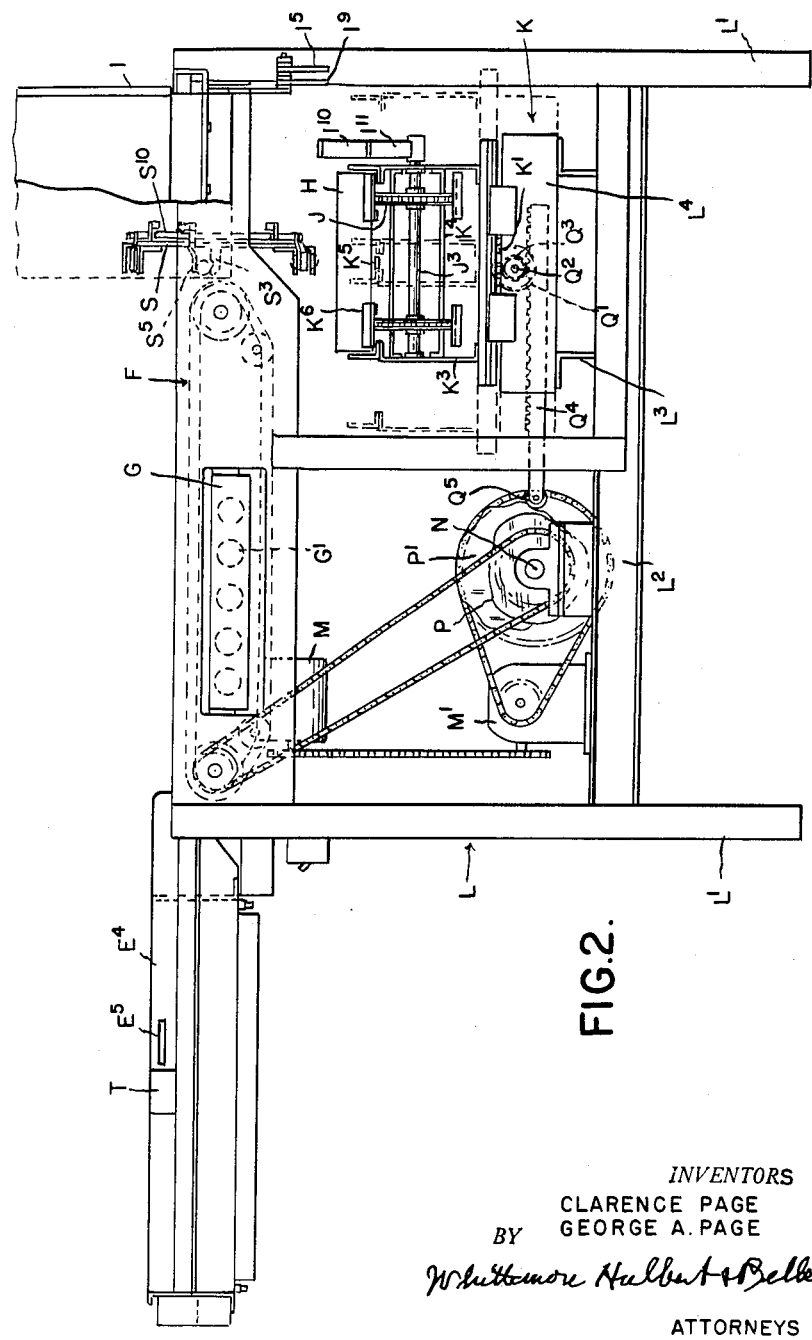
Fig. 2 is a front elevation thereof.

In the handling of eggs preparatory to merchandising, they are preferably first graded as to size and are then placed in holders which are usually of dozen size for retail sale, three-dozen size for wholesale and in some localities two and one-half dozen size. At some point in the handling, the eggs are candled or inspected and those found defective are removed. The mechanism forming the subject matter of the instant invention is designed to handle eggs which may have been previously graded but not candled and, as above stated, it is the object to secure completely automatic operation from this point to the delivery of the filled cartons.

In general construction the machine comprises a table A on which eggs are first deposited from any suitable source of supply. As shown a conveyor belt $A^1$ carries the eggs (preferably previously graded) across one end of the table A, and an inclined bar $A^2$ transfers them from the belt onto said table. This table has side rails $A^3$ for retaining the eggs thereon and is further provided with a soft flexible cover sheet B on which the eggs rest. At one end of the table is a gate C which is intermittently operated to permit the passage of a single row of eggs and the depositing of the same upon an adjacent, longitudinally traveling conveyor. To maintain the eggs on the table in operative relation to the gate, they are slowly advanced by means placing only a slight pressure against the individual eggs so as to avoid danger of breakage. This advancing means consists in an endless conveyor D passing around sprockets $D^1$ and having a series of bars or rollers $D^2$ extending transversely across the table. The flexible sheet B rests upon the rollers $D^2$ of the upper portion of the conveyor, which is traveling in the direction of the arrow or from the outer end of the table towards the gate C. As the sheet B is very flexible the eggs resting thereon will press it down between adjacent rollers and during advancement of the conveyor these rollers will propel the eggs forward. However, if there is any obstruction such as an accumulation of the eggs adjacent to the gate, the pressure exerted by the conveyor is too slight to endanger breakage. In other words, the eggs will be merely lifted and lowered as the rollers pass under the same, but whenever they are free to advance the forward pressure will be sufficient for this purpose. Some or all of the rollers $D^2$ preferably have grooves $D^3$ in the opposite and peripheral portions thereof with a helical shoulder at one edge of the groove for propelling the eggs from opposite sides towards the center of the table A. This is desirable for concentrating the eggs so as to leave no gaps in the series separated by the gate.

Row advancing means

The gate C is preferably formed as shown in Fig. 8 and comprises a rotary shaft $C^1$ journaled in bearings $C^2$ at its opposite ends and having intermediate said bearings a plurality of radially extending flanges $C^3$. Normally one of said flanges is in a substantially horizontal plane at the end of the conveyor D to receive eggs therefrom. Another flange extends upward in the path of the eggs, so that it is only when the roller is rotated through an angle of 90° or thereabouts that eggs can pass the gate. Such rotation is controlled by means which will later be described, and it operates only when more eggs are required to complete a longitudinally advancing series. Such series is formed by successive rows of eggs removed from the table A and deposited on a traveling conveyor E on the opposite side of the gate. The conveyor E comprises a pair of spaced, parallel, endless belts $E^1$, $E^2$ having their upper strands extending in a horizontal plane slightly lower than the gate C so that the eggs in the row transferred by the gate will roll down onto the belts. The space $E^3$ between the belts permits the eggs to drop slightly therein so as to be supported by the belts on the opposite sides thereof. A rail $E^4$ parallel to and on the outer side of the belts retains the eggs from dropping off, and therefore the row or series will be advanced longitudinally thereof. Each of the spaced belts $E^1$, $E^2$ will advance or turn an egg in contact therewith and this prevents any clogging which might otherwise occur when eggs are deposited by the gate C. A single central belt $E^5$ extends forward from the belts $E^1$ and $E^2$ to continue the advancement of the series which might extend to the point where the eggs are to be deposited in the cartons but preferably we interpose a candler of the following construction.

Candler

F is an endless conveyor in alignment with the conveyor E, which is formed by spaced chains $F^1$ having spaced hour-glass shaped rollers $F^2$ extending therebetween. The eggs from the conveyor E will be deposited between pairs of adjacent rollers $F^2$ and, during the forward progress of the upper strands of the chains $F^1$, will be moved over the candler. This consists of a box G containing electric light bulbs $G^1$, said box being open at the top for the passage of an upwardly directed beam of light centrally beneath the row of eggs on the conveyor F. During the interval in which the rollers $F^2$ are passing over the box G, rotary motion is intermittently imparted to these rollers to spin the eggs supported thereon. As shown in Figs. 9 and 10, a series of constantly rotating friction wheels $F^3$ are arranged beneath the portion of the conveyor F which passes over the box G. These wheels are in the path of cooperating friction wheels $F^4$ at the end of each roller $F^2$ and are adapted in the progress of the conveyor to raise each roller and impart rotary motion thereto while passing over the corresponding friction roller $F^3$. As a result adjacent rollers will spin the egg supported therebetween while passing over the friction wheels $F^3$, but will cease to rotate during the intervals in which the friction wheels $F^4$ pass between the adjacent friction wheels $F^3$. Rotation thus imparted to the egg will be communicated to the fluid within the shell and, when rotation of the shell ceases, the interior fluid will continue to rotate. Thus the inspector viewing the egg from the top as illuminated by the light beam will detect any imperfections in the interior of the egg as the fluid therein continues its rotation. Every egg on the conveyor F is successively subjected to this inspection and the time interval for passing over the box G is sufficiently long for the careful observation of each. The friction wheels $F^3$ are driven by pulleys $F^5$ on the shafts thereof and belts $F^6$, which in turn are driven by a small electric motor $F^7$ mounted on the frame of the machine.

The advancing row of eggs after passing the candler will come into operative relation to the depositing means, but before describing the latter we will first describe the carton handling means. As above stated, the eggs are usually held in either dozen, two and one-half dozen or three-dozen lots. The holders for the dozen lots provide two rows of six cells each, while the holders for the three-dozen lots have six rows of six cells each and are of equal dimensions in length and width. We will therefore describe the mechanism for handling the three-dozen cartons with the understanding that adjustment can be easily made to similarly handle cartons for different numbers of eggs.

*Carton conveying means*

The cartons H are usually formed of cardboard strips having spaced transverse slits therein for cross engagement with each other to form a series of cells. In the three-dozen carton, there are six transversely extending rows $H^1$ of six cells $H^2$ in each row. There is also a bottom sheet $H^3$ which extends under all of the cells and affords support for the eggs therein. These cartons are placed in vertical series within a magazine I from which they are periodically dropped upon a carton conveyor J and are intermittently advanced by the latter from row to row. The conveyor J is mounted on a transversely movable carriage K which in turn is mounted on a frame L supporting the magazine I and most of the mechanism thus far described. This frame includes corner post members $L^1$ and longitudinal and transverse bars connecting the same. The conveyors C and F are mounted on the upper portion of this frame, but the carriage K and conveyor J are at a lower level being mounted primarily on bars or beams $L^2$ which extend in the direction of the conveyors C and F. Cross bars $L^3$ are mounted on the beams $L^2$ and track members $L^4$ are mounted upon and extend transversely of the bars $L^3$. These track members are grooved along their upper edges to receive balls $K^1$, and the carriage K is provided with bars $K^2$ grooved on their lower edges to engage and rest upon the balls $K^1$. This forms a roller bearing support for the carriage K which permits the latter to move with slight frictional resistance back and forth on the track members $L^4$. The upper part of the carriage K is formed by side channel bars $K^3$ and cross bars $K^4$. There is also a slatted top $K^5$ supported on the cross bars $K^4$, which top forms the direct support for the cartons. The conveyor J is formed by endless chains $J^1$ passing around sprockets $J^2$ on shafts $J^3$ located at the forward and rear end of the side bars K. The chains pass around the cross bar $K^4$ but are below the slatted top $K^5$. However, bars $K^6$ attached to the chains and spaced to receive a carton therebetween pass over the slatted top to move the cartons resting thereon. The arrangement of the carriage K and conveyor J is such that the cartons can be intermittently advanced longitudinally and transversely to successively register the cells thereof with the point where the eggs are dropped into engagement therewith. Such intermittent movements are effected by the following mechanism.

Mounted on the frame L is a motor M, which is connected through a reduction transmission $M^1$ with a shaft N rotated at a low angular speed, such as 4 R. P. M. On the shaft N are pairs of cams O, $O^1$ and P, $P^1$. The cams O and $O^1$ are alternatively used for intermittently actuating the carriage K, the cam O being used for the filling of three-dozen size cartons and the cam $O^1$ for the one-dozen. Thus these cams, which are splined to the shaft N, may be adjusted thereon to bring them alternatively in operative relation with the cooperating mechanism. The carriage K has secured to its underside a pair of spaced parallel rack bars Q, which engage pinions $Q^1$ on a shaft $Q^2$ journaled in bearings in the track members $L^4$. The shaft $Q^2$ has also a pinion $Q^3$ thereon which is of smaller diameter and is engaged with a rack bar $Q^4$. The rack bar $Q^4$ has attached to one end thereof a roller $Q^5$ which forms a follower engaging the periphery of one or the other of the cams O, $O^1$. A spring $Q^6$ engaging the rack bar $Q^4$ urges the same in a direction to maintain the follower $Q^5$ in contact with the periphery of the cam. The cams are fashioned to impart intermittent movements to the rack bar, which through the pinion $Q^3$ rotates the shaft $Q^2$, and through the pinions $Q^1$ imparts movement to the rack bars Q and through the latter to the carriage K. By reason of the fact that the pinions $Q^1$ are larger than the pinion $Q^3$, the amplitude of movement imparted to the carriage is greater than that which could be produced by the rack bar $Q^4$ and this permits of using cams of smaller diameter. Each of the intermittent movements of the carriage is equal to the dimension between adjacent cells of the carton, and the total number of movements in one direction is equal to the number of cells in one row of the carton which in the construction illustrated is six but may be any number by a suitable change in cams. After these six movements, the carriage J is advanced (by means later described) to bring another row of cells in alignment with the egg depositing point, and the carriage will then be moved in the reverse direction under the actuation of the spring $Q^6$ to perform six more intermittent advancements. This completes the cycle of the cam, which after another movement of the conveyor repeats the cycle and so on until all of the cells of the carton are filled. For intermittently actuating the conveyor J to advance the cartons from row to row, one of the shafts $J^3$ has mounted thereon a ratchet wheel R. A rod $R^1$ slidable in bearings on the carriage has attached to one end thereof a pawl $R^2$ engaging the teeth of said ratchet wheel to intermittently rotate the same and, through its shaft and the sprocket wheel thereon, actuate the conveyor. The rod $R^1$ is itself actuated by a lever $R^3$ having its end portion $R^4$ slidably engaging a rod $R^5$ on a rockable member $R^6$, which latter is actuated from one or the other of the cams O and $O^1$ through the medium of a bell crank lever $R^7$ and connecting rod $R^8$. The rod $R^5$ is of sufficient length so that the portion $R^4$ of the lever $R^3$ will remain in engagement therewith in all positions of the carriage K. Thus after one row of cells has been filled with eggs and the carriage is at that end of its movement, the conveyor J is actuated to bring another row in alignment with the depositing means, and when this row is completely filled and the carriage is at the opposite end of its movement, the conveyor is similarly advanced to bring another row in alignment. However, in passing from one carton to another the space between the cells is somewhat greater as there is a feed bar $K^6$ between adjacent cartons. The required additional movement is supplied by making the distance between the teeth of the ratchet wheel at one point $R^9$ greater than between the other teeth.

*Carton holding magazine*

The magazine I is open at the top and is of a cross-sectional area to receive a stack of cartons, each carton including a cellular portion and a bottom portion. The lowermost carton of the series rests upon fingers $I^1$ which are periodically withdrawn to drop the series to a lower position supported by other fingers $I^2$, after which the upper fingers $I^1$ are reinserted between the lowermost carton and the next higher one of the series. The fingers $I^2$ are then withdrawn to drop the freed lowermost carton onto the conveyor J. The mechanism for operating the fingers $I^1$ and $I^2$ is illustrated in Figs. 3 and 12 and comprises a pair of rocker members $I^3$ to which the fingers $I^1$ are attached, said rocker members being pivotally mounted upon opposite sides of the magazine I. The rods $I^4$ extend from these rocker members to a bell lever $I^5$ pivotally mounted on a bracket $I^6$ depending from the magazine. Normally the fingers $I^1$ are projected to support the stack of cartons, but a movement of the bell crank lever $I^5$ to raise the rods $I^4$ will actuate the rockers $I^3$ to withdraw the fingers $I^1$ and permit the stack to drop until movement is arrested by the fingers $I^2$. The latter are preferably formed integral with rocker members $I^7$ similarly arranged on the magazine beneath the rocker members $I^3$ and similarly operated by rods $I^8$ and a bell crank lever $I^9$. Thus after the actuation of the bell crank lever $I^5$, which relieves the fingers $I^1$ and permits the stack of cartons to drop, said fingers will be reinserted beneath the bottom member of the next higher carton. Subsequently, the bell crank lever $I^9$ will be actuated to release the fingers $I^2$ and drop the lowermost carton onto the slatted top of the carriage. The bell crank levers $I^5$ and $I^9$ are successively actuated by arms $I^{10}$ and $I^{11}$ both mounted on the shaft $J^3$ at the forward end of the conveyor J. Once in each cycle of this shaft, these arms will successively actuate the said bell crank levers with the result that a carton is deposited on the carriage. The timing is such that a carton is thus deposited as soon as space is provided by the advancement of a previously deposited carton through the operation of the conveyor J. The mechanism just described is only one specific construction and other means for successively releasing cartons from the mechanism may be substituted therefor.

*Egg depositing mechanism*

The eggs advanced through the candler as previously described are spaced from each other by the rollers $F^2$ of the conveyor F and thus successively reach the forward end of said conveyor. At this point they are received by the depositing mechanism which is of the following construction. A rotary wheel S is arranged in a plane transverse to the direction of advancement of the conveyor F and is driven from the latter through the medium of bevel gear wheels $S^1$ and $S^2$. The wheel S has mounted thereon a series of egg-holding clamps which are successively registered with the conveyor F to receive an egg therefrom and then carry it around with the wheel through an angle of 90° to the point where the egg is released and dropped into a cell of the carton. Each of the clamps of the series includes a pair of spaced fingers $S^3$ which, when registered with the conveyor J, will be slightly below the upper portion thereof and opposite the portion passing around the sprocket. This will permit the egg to roll off from its seat between rollers $F^2$ onto the fingers $S^3$, which are slightly concaved on their upper edges at $S^4$. A cooperating finger $S^5$ will then clamp the egg and hold it until it reaches the point for deposit. The finger $S^5$ is on a rock shaft $S^6$ mounted on the wheel S and a spring $S^7$ biases said finger towards clamping position. However, an arm $S^8$ on the shaft $S^6$ engages a cam $S^9$ on a stationary plate $S^{10}$ and the cam is so positioned that the finger $S^5$ is retracted when the egg is deposited on the fingers $S^4$ and is then released to clamp it. After the wheel S has traveled through an angle of approximately 90° another cam $S^{11}$ on the plate $S^{10}$ will release the finger $S^5$ permitting the egg to drop into the registering cell of the carton. In this travel of the wheel the egg is turned so that its major axis, which was horizontal on the conveyor J, is vertical when the egg is released to drop into the cell.

*Means for filling gaps in the advancing series of eggs*

By reason of the fact that the series of eggs passes through the candler and that some eggs are removed, this would leave gaps in the series which if not filled would leave certain cells of the cartons unfilled. To avoid such a result we provide mechanism for advancing the series towards the candler at a faster rate than from there on. Such advancement is by the belts E', $E^2$ and $E^5$ which travel faster than the conveyor F. However, the series on the belts is only frictionally driven and therefore will not advance faster than necessary. Whenever the operator of the candler removes an egg from the conveyor F, which he accomplishes by his right hand, he at the same time uses his left hand to advance the series from the belt $E^5$ over the conveyor F. As the eggs are rotating when passing through the candler they can be easily advanced by the slight additional force supplied through the left hand of the operator. In this manner all gaps are filled before the series reaches the depositing mechanism.

*Automatic gate control*

The transfer of eggs from the table A is accomplished by the operation of the gate C as has been previously described. It is necessary, however, to control this operation so that eggs will be supplied to the series only as fast as required, which is accomplished as follows. The shaft C' of the gate has revolubly mounted on one end thereof a pulley $C^4$ which is connected by a belt $C^5$ with a pulley $C^6$ on the shaft $D^3$ of the endless conveyor D, but this does not necessarily communicate rotation to the shaft C'. The latter is always rotating when the machine is in operation as is also the belt $C^5$ and pulley $C^4$. Mounted on this shaft in frictional contact with one side of the pulley $C^4$ is a ratchet wheel $C^7$ which, however, is normally held against rotation by a dog $C^8$ engaging one of the teeth of said ratchet wheel. There are four of these teeth equally spaced, and therefore, when the dog is released, the pulley $C^4$, shaft C' and ratchet wheel will be rotated through one-quarter of a revolution turning the gate C the same amount. The dog $C^8$ has a bell crank arm $C^9$ and a solenoid, or other electromagnetic motor $C^{10}$ when energized will move this bell crank arm to release the dog. Operation of the solenoid $C^{10}$ is controlled by the eggs on the conveyor E, the arrangement being such that any gap in the series will close a switch energizng the motor. This switch is preferably operated by a light sensitive electric cell T which in turn is operated by a beam of light extending transversely of the conveyor and interrupted by the eggs carried by the conveyor. As shown an electric lamp T' is mounted to project a light beam diagonally across the conveyor E and through an aperture $E^6$ in the rail $E^4$ into the cell T. This beam is, however, interrupted by eggs on the conveyor E, and it is only when there is an open gap that the beam is effective to operate the cell T and through the latter to energize the solenoid $C^{10}$. Thus whenever the supply of eggs deposited on the conveyor E is exhausted, the gate will be operated to deposit another series on said conveyor. In this way the supply of eggs to the candler and to the depositing mechanism is automatically maintained. It is necessary, however, that the dog $C^8$ when released from one ratchet tooth should be instantly returned to engage the next tooth of the ratchet wheel, which is accomplished as follows. The movable core $C^{11}$ of the solenoid has a link $C^{12}$ pivotally attached thereto and the lower end of this link has a pin $C^{13}$ for engaging the bell crank arm $C^9$ to release the dog. However, an extension of the pin $C^{13}$ engages an inclined track $C^{14}$ so that in the further upward movement of the core $C^{11}$ the pin will be disengaged from the arm $C^9$. This permits the arm to drop thereby re-engaging the dog with the ratchet wheel when the solenoid is de-energized and the core $C^{11}$ and link $C^{12}$ drop the pin $C^{13}$ engaging an inclined end $C^{15}$ of the arm $C^9$ will be deflected to pass beneath the other so as to be in position for another operation.

Operation

From the description above, the operation of the machine will be understood, but it may be briefly restated as follows. Eggs traveling on the conveyor A' are transferred therefrom by the inclined bar $A^2$ to the table A on top of the flexible cover B. The traveling conveyor D beneath the cover B will cause the advancement of the eggs over the table towards the gate C, but the force exerted is not sufficient to endanger breakage. The gate is operated by the mechanism above described whenever there is a gap in the series of eggs on the conveyor E to transfer another row of eggs from the table A onto said conveyor. The latter will advance the series to the conveyor F, which carries them through the candler. The hour-glass shaped rollers $F^2$ of the conveyor F are intermittently rotated by passing over the friction wheels $F^3$ which are in constant rotation, being driven by the motor $F^7$, pulleys $F^5$ and belts $F^6$. Thus as the eggs pass over the light beam from the light bulbs G' in the box G, they are inspected and when they are bad are removed from the series. The gap is then refilled by the inspector, who manually advances the series over the rollers $F^2$. At the end of the conveyor F, the eggs are successively transferred to the clamping holders on the wheel S and are carried thereby into position for dropping into the cells of the cartons. During this transfer the long axis of the egg is changed from horizontal to vertical, and the clamping and unclamping of the holders is effected by cams on the stationary plate $S^{10}$. The cartons stacked in the magazine I are successively dropped therefrom onto the carriage K and are intermittently advanced longitudinally thereover by the conveyor J. Such advancement is only from row to row of cells in the carton while the step by step transverse movement of the carriage successively registers the cells in each row with the egg dropping point. In this manner all of the cells in each carton are filled with eggs and the filled cartons are delivered from the rear end of the carriage. The mechanism for effecting these movements has been previously fully described and it is unnecessary to repeat the description of the same.

What we claim as our invention is:

1. In a machine for handling eggs, a support for a mass of eggs, means for advancing the eggs over said support, a gate in the path of advancement against which the eggs accumulate, means for intermittently opening said gate to release and separate an adjacent row of eggs from a mass, a conveyor on which the released row is deposited for frictionally advancing the same, a second conveyor for receiving eggs from the first and holding them in spaced relation to each other with the major axis of each egg extending transversely of the conveyor, and a third conveyor located in a transverse plane and intermittently operated being adapted to successively receive and clamp the spaced eggs from said second conveyor and rotate the same through an angle of 90°, thereby changing the major axis from horizontal to vertical, means for releasing the clamped egg when in vertical position to drop the same, and means for successively registering the cells of a carton with the dropping point to receive the dropped eggs.

2. A machine for packaging eggs in cartons, each of which has a plurality of parallel rows of individual egg receiving cells; comprising a frame, a carton supporting carriage mounted for rectilinear reciprocation on said frame, a carton conveyor on said carriage movable in a transverse direction, means on said frame above said carriage for successively delivering eggs and dropping the same from a fixed point, and mechanism timed to operate in intervals between successive dropping of the eggs for moving said carriage step by step to successively register the cells of a row with said dropping point in each direction of reciprocation of the carriage and to advance said conveyor and carton to register another row in the interval between the last carriage step in one direction and the first step in the reverse direction.

3. The construction as in claim 2 in which said conveyor is advanced a greater distance between the last row of one carton and the first row of a succeeding carton to provide clearance between cartons.

4. The construction as in claim 3 provided with a magazine for a stack of cartons which is mounted on said frame above and in registration with a portion of said carriage, and means for releasing the lowermost carton of the stack to deposit the same on said carriage actuated by the movement of said conveyor which clears the previously deposited carton.

5. In a machine for handling and packaging eggs; means for advancing in a single straight line series eggs having their long axes extending horizontally, means located at the discharge end of said series for successively receiving eggs therefrom, turning each until its long axis extends in a vertical line, and then dropping the same, a support for a multi-cell carton beneath and adjacent to said last mentioned means, and means for moving said support to successively register the cells of said carton with said vertical line to receive the dropped eggs until all of said cells are filled.

6. The construction as in claim 5 in which the means located at the discharge end of said series is a rotary conveyor having a series of spaced egg holders thereon, one being in registration with the discharge end of the series at substantially the same level to receive an egg therefrom, means operating after the reception of an egg on said holder for clamping it thereto, and means operating after a rotation of said holder through 90° for releasing said clamp to drop the egg with its long axis extending vertically.

7. In a machine for packaging eggs, means for intermittently separating from a mass of eggs aligned series thereof, a conveyor for receiving and longitudinally advancing said series with the individual eggs held out of contact with each other during advancement, means for successively dropping the advanced eggs from a fixed point, and means for successively registering the cells of a carton with and beneath said fixed point timed with the droppings to receive an egg in each cell.

8. The construction as in claim 7 in which the distance through which each egg is dropped is limited not to greatly exceed the length of an egg.

References Cited in the file of this patent

UNITED STATES PATENTS

| | | |
|---|---|---|
| 952,352 | Pieper | Mar. 15, 1910 |
| 2,045,767 | Funk | June 30, 1936 |
| 2,195,942 | Stonestreet | Apr. 2, 1940 |